(12) United States Patent
Li et al.

(10) Patent No.: US 9,451,433 B2
(45) Date of Patent: Sep. 20, 2016

(54) DEVICE AND METHOD OF DRIVING MULTI-PDP DATA COMMUNICATION FOR MOBILE BROADBAND DEVICE

(71) Applicant: ZTE Corporation, Shenzhen, Guangdong (CN)

(72) Inventors: Yanfeng Li, Shenzhen (CN); Zhao Zuo, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 5 days.

(21) Appl. No.: 14/406,861

(22) PCT Filed: Nov. 29, 2012

(86) PCT No.: PCT/CN2012/085574
§ 371 (c)(1),
(2) Date: Dec. 10, 2014

(87) PCT Pub. No.: WO2013/185441
PCT Pub. Date: Dec. 19, 2013

(65) Prior Publication Data
US 2015/0140985 A1 May 21, 2015

(30) Foreign Application Priority Data
Jun. 12, 2012 (CN) .......................... 2012 1 0191576

(51) Int. Cl.
*H04W 4/18* (2009.01)
*H04W 76/02* (2009.01)
*H04L 29/06* (2006.01)

(52) U.S. Cl.
CPC ............... *H04W 4/18* (2013.01); *H04L 69/08* (2013.01); *H04L 69/24* (2013.01); *H04W 76/022* (2013.01)

(58) Field of Classification Search
CPC ................... H04M 1/72525; H04M 1/72522; H04M 3/42178; H04M 2207/18; H04M 2250/02; H04M 1/72533; H04W 8/265; G08C 17/02
See application file for complete search history.

(56) References Cited

U.S. PATENT DOCUMENTS

2006/0222009 A1    10/2006  Yao
2011/0019654 A1*   1/2011   Harmatos ............. H04W 92/02
                                                     370/338
(Continued)

FOREIGN PATENT DOCUMENTS

CN    1805430 A      7/2006
CN    101808270 A    8/2010
(Continued)

OTHER PUBLICATIONS

International Search Report in international application No. PCT/CN2012/085574, mailed on Mar. 21, 2013.
(Continued)

*Primary Examiner* — Kamran Afshar
*Assistant Examiner* — Farideh Madani
(74) *Attorney, Agent, or Firm* — Oppedahl Patent Law Firm LLC

(57) ABSTRACT

A device and method of driving multi-Packet Data Protocol (PDP) data communication for a mobile broadband device are disclosed. The device includes: a Radio Interface Layer (RIL) module which is configured to receive a function call request message based on data or a configuration service, and call a PDP management module through an extended multi-PDP support interface; a PDP management module, which is configured to acquire a PDP type of an access device corresponding to the function call request and currently supported by the system, trigger a PDP control module, and update and maintain a PDP resource state table; a PDP control module which is configured to encapsulate the function call request message into a Qualcomm MSM Interface (QMI) instruction or covert it into an AT instruction, carry in the instruction identifier information of the access device and output the instruction to a device management module; and a device management module, which is configured to send the instruction to the corresponding access device to perform PDP setup. The present disclosure is capable of supporting a multi-PDP data communication mode and increasing the access speed for a radio broadband device.

18 Claims, 4 Drawing Sheets

(56) References Cited

U.S. PATENT DOCUMENTS

| | | | |
|---|---|---|---|
| 2011/0235614 A1 | 9/2011 | Lerzer | |
| 2012/0307824 A1* | 12/2012 | Sun | H04L 12/2859 370/389 |
| 2013/0005320 A1* | 1/2013 | Li | H04W 76/022 455/418 |
| 2014/0286310 A1 | 9/2014 | Lerzer | |
| 2015/0140985 A1* | 5/2015 | Li | G06F 9/46 455/418 |

FOREIGN PATENT DOCUMENTS

| | | | |
|---|---|---|---|
| CN | 102323892 | * | 1/2012 |
| CN | 102323892 A | | 1/2012 |
| CN | 102360307 A | | 2/2012 |
| CN | 102385557 A | | 3/2012 |
| CN | 102448136 A | | 5/2012 |
| CN | 102707997 A | | 10/2012 |
| WO | 2010034377 A1 | | 4/2010 |
| WO | 2011110094 A1 | | 9/2011 |
| WO | 2011156990 A1 | | 12/2011 |

OTHER PUBLICATIONS

English Translation of the Written Opinion of the International Search Authority in international application No. PCT/CN2012/085574, mailed on Mar. 21, 2013.

Implementation of multiple pdp contexts on android, Oct. 2010.

Supplementary European Search Report in European application No. 12879136.5, mailed on Nov. 13, 2015.

* cited by examiner

DEVICE AND METHOD OF DRIVING MULTI-PDP DATA COMMUNICATION FOR MOBILE BROADBAND DEVICE

TECHNICAL FIELD

The present disclosure relates to the field of radio communication technology, and more particularly to a device and method of driving multi-Packet Data Protocol (PDP) data communication for a mobile broadband device.

BACKGROUND

At present, with the evolution of technology and the popularization of mobile broadband, the mobile internet has provided rich services, such as home entertainment and business office. Based on the expansion of 3G and 4G services, more and more internet applications are developed, which makes the pursuit of mobile broadband speed become one of the main goals. Based on the pattern of global wireless chip, the high-speed access solution for mobile broadband device of Network Driver Interface Spec (NDIS)+Qualcomm MSM Interface (QMI) which is advocated by Qualcomm and Microsoft becomes one of the current main access ways of mobile broadband device; however, because of limit of existing technology and network, the speed of mobile broadband device under single PDP achieves the so-called ceiling, and is gradually unable to meet the endless pursuit of users of speed and requirement of users for diversity of data access way.

With the popularity of embedded smart device, handheld smart terminal, and especially products like PDA, the Android mobile operation system enjoys great popularity and support because of its openness and open resource character. According to the latest market statistics, the system has become the mobile operation system with the highest market share, so adapting various mobile broadband devices on the Android system becomes one of the current main works. Because of limit of existing characters of the Android system, only the Point to Point Protocol (PPP) networking way and other networking ways are supported, the current more popular NDIS device with higher speed can not be supported, and further the multi-PDP data service can not be supported.

The Chinese patent CN102323892A has disclosed a data processing method and a driving device of a mobile broadband device; The Chinese patent CN102360307A has disclosed a method and device for processing driving message of equipment, as shown in FIG. 1, which realize that the Android system adopts the NDIS port with higher speed and the QMI protocol to implement the NDIS access way; although such method adds the NDIS as a new high-speed data access way for the Android system, but in the Radio Interface Layer (RIL) framework of the current Android system, only the method of single data communication is supported, that is, at the same time, either the way of PPP or the way of NDIS can be selected, the way of PPP+PPP, the way of PPP+NDIS and the way of NDIS+NDIS can not be selected simultaneously, which makes the communication way of simultaneously establishing multiple data links on the Android system impossible, and greatly limits requirement of users for high speed of mobile broadband device and data access diversity.

SUMMARY

This present disclosure provides a device and method of driving multi-PDP data communication for a mobile broadband device, so as to solve the problem in the prior art that the mobile broadband device is incapable of performing multi-PDP data communication.

For solving the above problem, a technical solution adopted by the present disclosure is as follows.

On one hand, the present disclosure provides a device of driving multi-PDP data communication for a mobile broadband device; the device includes: an RIL module, a PDP management module, a PDP control module and a device management module; wherein, the RIL module is configured to receive a function call request message based on data or a configuration service from an Android system, call the PDP management module through an extended multi-PDP support interface, and send the function call request message to the PDP management module;

the PDP management module is configured to acquire a PDP type of an access device corresponding to the function call request sent from the RIL module and currently supported by the Android system, trigger the corresponding PDP control module according to the PDP type, and send the function call request message to the PDP control module; the management module is further configured to, after the PDP is set up or destroyed successfully, update a maintained PDP resource state table in which a PDP type, a PDP state and identifier information of the corresponding access device are recorded;

the PDP control module is configured to encapsulate, based on NDIS or PPP, the function call request message sent from the PDP management module into a QMI instruction or covert it into an AT instruction, carry the identifier information of the access device in the QMI instruction or the AT instruction and output the instruction to the device management module; and the device management module is configured to send, according to the identifier information of the access device, the QMI instruction or the AT instruction sent from the PDP control module to the corresponding access device to perform PDP setup.

Furthermore, the devices of the present disclosure also have the following characteristics:

the RIL module is further configured to, after receiving an application data request message from the Android system, call the PDP management module through the extended multi-PDP support interface, and send the function call request message to the PDP management module; and the PDP management module is further configured to, after receiving the function call request message from the RIL module, acquire the PDP in idle state according to the PDP resource state table, and allocate the PDP in idle state for this application data request according to a preset selection rule to perform PDP register.

Preferably, the PDP management module is specifically configured to save the preset selection rule;

wherein, the selection rule includes: determining whether there are different PDP types of the PDP in idle state, if so, preferentially selecting the PDP type with high processing speed to allocate PDP; or else, allocating PDP in order or randomly.

Furthermore, the devices of the present disclosure also have the following characteristics:

the device management module is specifically configured to acquire the access device corresponding to the QMI instruction or the AT instruction by inquiring a maintained device state information table;

wherein, the device state information table includes: state information, supported PDP type information and identifier information of each access device which is currently supported by the system.

Furthermore, the PDP management module is specifically configured to acquire the PDP type of the access device currently supported by the system by calling the device management module.

Furthermore, the devices of the present disclosure also have the following characteristics: the PDP control module specifically includes: an NDIS sub-module and an AT sub-module; wherein, the NDIS sub-module is configured to encapsulate, through a QMI daemon, the function call request message based on NDIS into a corresponding QMI instruction, carry in the QMI instruction the identifier information of the corresponding access device, and output the instruction to the device management module through an NDIS drive process; and the AT sub-module is configured to convert a PPP-based PDP setup request into a corresponding AT instruction, carry in the instruction the identifier information of the corresponding access device, and output the instruction to the device management module through a PPP drive process.

On the other hand, the present disclosure also provides a method of driving multi-PDP data communication for a mobile broadband device; the method includes:

after receiving the function call request message based on data or a configuration service from the Android system, calling a PDP management process through the extended multi-PDP support interface;

using the PDP management process to acquire the PDP type of the access device corresponding to the function call request and currently supported by the Android system, and calling a PDP control process according to the PDP type;

using the PDP control process to encapsulate the function call request message into a QMI instruction or covert it into an AT instruction; after carrying identifier information of the corresponding access device in the QMI instruction or the AT instruction, calling a device management process;

using the device management process to send the QMI instruction or the AT instruction to an access device corresponding to the identifier information of the access device to perform PDP setup;

wherein, after the PDP is set up or destroyed successfully, the PDP management process updates a maintained PDP resource state table in which a PDP type, a PDP state and identifier information of the corresponding access device are recorded.

Furthermore, the method of the present disclosure also has the following characteristics:

when an application data request message from the Android system is received, calling the PDP management process through the extended multi-PDP support interface; and using the PDP management process to acquire a PDP in idle state according to the PDP resource state table, and allocating a certain PDP in idle state for this application data request according to a preset selection rule to perform PDP register.

Preferably, the preset selection rule includes: determining whether there are different PDP types of the PDP in idle state, if so, preferentially selecting the PDP type with high processing speed to allocate PDP; or else, allocating PDP in order or randomly.

Furthermore, the method of the present disclosure also has the following characteristics: before using the device management process to send the QMI instruction or the AT instruction to an access device corresponding to the identifier information of the access device, the method further includes that: the device management process acquires the access device corresponding to the QMI instruction or the AT instruction by inquiring a maintained device state information table; wherein, the device state information table includes: state information, supported PDP type information and identifier information of each access device which is currently supported by the system.

Compared with the prior art, the beneficial effects of the present disclosure are as follows.

For meeting the requirement of customer for higher data communication speed and richer data application, the device and method of the present disclosure provide a data access way for a mobile broadband device based on multiple NDIS interfaces. The method and device increase the communication speed between a mobile broadband device and a device driver, extend the existing data access way, integrate the existing NDIS solution of board-side, greatly reduce the difficulty and workload of board-side development, and reduce the cost of development.

DETAILED DESCRIPTION

The technical solution in the embodiment of the present disclosure is clearly and completely described below in combination with the accompanying drawings in the embodiment of the present disclosure. Obviously, the embodiments described are only a part of embodiments of the present disclosure instead of all embodiments. Based on the embodiments of the present disclosure, all the other embodiments obtained, on the premise of not involving any creative work, by the ordinary skilled personnel in the field shall fall within the scope of the claims of the present disclosure.

For meeting the requirement of customer for higher data communication speed and richer data application, the present disclosure provides a device and method of driving multi-PDP data communication for a mobile broadband device. The present disclosure developed a multi-PDP data communication mode based on NDIS or PPP by utilizing existing software and characteristic on the Android system; the multi-PDP data communication mode may implement seamless joint on basis of existing RIL driver of the Android system, which can not only implement multi-PDP support based on NDIS or PPP and increase the access speed of a mobile broadband device, but also modify less framework of the Android system.

The specific implementation process of the present disclosure is elaborated below through several specific embodiments.

Embodiment 1

Figure 1:
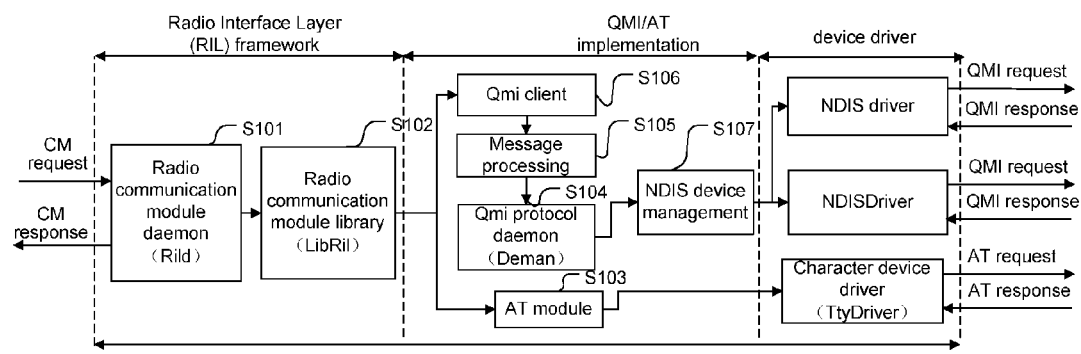
FIG. 1 is a structure diagram of the Android system adopting an NDIS access way in the prior art.
Figure 2:
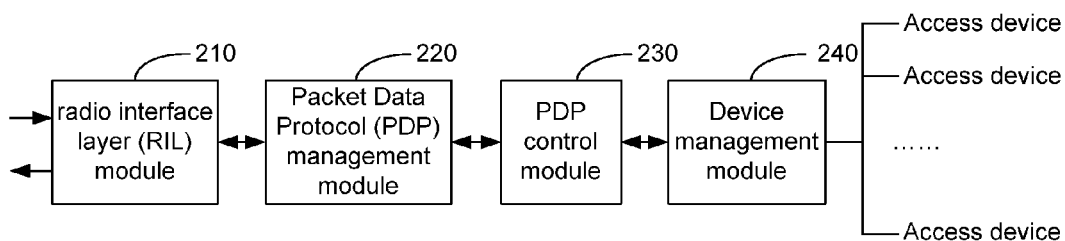
FIG. 2 is a structure diagram of a device of driving multi-PDP data communication for a mobile broadband device provided by a first embodiment of the present disclosure.

As shown in FIG. 2, the embodiment of the present disclosure provides a device of driving multi-PDP data communication for a mobile broadband device, which specifically includes: an RIL module 210, a PDP management module 220, a PDP control module 230 and a device management module 240; wherein, the RIL module 210 is configured to receive a function call request message based on data or a configuration service from the Android system, and call the PDP management module 220 through an extended multi-PDP support interface;

the PDP management module 220 is configured to acquire a PDP type of a corresponding access device called by the RIL module 210 according to the function call request and currently supported by the system, and send the function call request message to the PDP control module 230 according to the PDP type; the management module is further configured to, after the PDP is set up or destroyed successfully, update a maintained PDP resource state table in which a PDP type, a PDP state and identifier information of the corresponding access device are recorded; wherein, the PDP type of the access device includes: an NDIS-based PDP and a PPP-based PDP;

the PDP control module 230 is configured to encapsulate, based on NDIS or PPP, the function call request message sent from the PDP management module 220 into a QMI instruction or convert it into an AT instruction, carry the identifier information of the corresponding access device in the QMI instruction or the AT instruction and output the instruction to the device management module 240; wherein, the QMI instruction includes Wireless Data Service (WDS), Control Service (CTL) and Device Management Service (DMS); and the device management module 240 is configured to send, according to the identifier information of the access device, the QMI instruction or the AT instruction sent from the PDP control module 230 to the corresponding NDIS access device or PPP access device to perform PDP setup.

Furthermore, when the device of the present embodiment implements processing of downlink application data flow, the RIL module 210 is further configured to, after receiving an application data request message from the Android system, call the PDP management module 220 through the extended multi-PDP support interface; correspondingly, the PDP management module 220 is further configured to acquire the PDP in idle state according to the PDP resource state table saved by itself, and allocate a certain PDP in idle state for this application data request according to a preset selection rule to perform PDP register. Wherein, after performing PDP register, a network corresponding to the PDP may be applied to perform data communication.

Preferably, the preset selection rule includes: determining whether there are different PDP types of the PDP in idle state, if so, preferentially selecting the PDP type with high processing speed to allocate PDP; or else, allocating PDP in order or randomly.

Furthermore, in the device of the present embodiment, the PDP control module 230 includes: an NDIS sub-module and an AT sub-module; wherein, the NDIS sub-module is configured to encapsulate, through a QMI daemon, the function call request message based on NDIS sent from the PDP management module 220 into a corresponding QMI instruction, carry in the QMI instruction the identifier information of the corresponding access device, and output the instruction to the device management module 240 through an NDIS drive process; and the AT sub-module is configured to convert the function call request message sent from the PDP management module 220 and a PPP-based PDP setup request into a corresponding AT instruction, carry in the instruction the identifier information of the corresponding access device, and output the instruction to the device management module 240 through a PPP drive process.

Furthermore, the device management module 240 is specifically configured to acquire the NDIS access device or PPP access device corresponding to the QMI instruction or the AT instruction by inquiring the maintained device state information table; wherein, the device state information table includes: state information, supported PDP type information and identifier information of each access device which is currently supported by the system.

Furthermore, the PDP management module 220 is specifically configured to acquire the PDP type of the access device currently supported by the system and the identifier information of the access device by calling the device management module.

Embodiment 2

Figure 3:
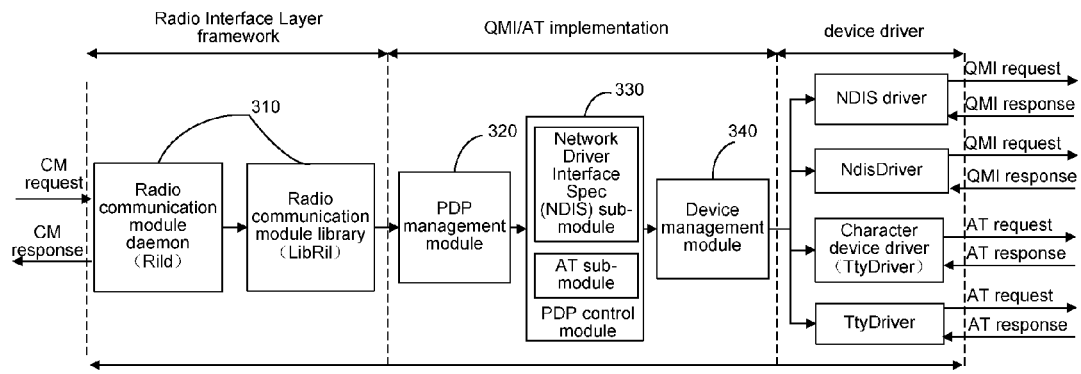
FIG. 3 is a structure diagram of a device of driving multi-PDP data communication for a mobile broadband device provided by a second embodiment of the present disclosure.

The device of driving multi-PDP data communication for a mobile broadband device provided by the present embodiment is a further elaboration of the device solution described in embodiment 1. As shown in FIG. 3, the driving device provided by the present embodiment specifically includes: an RIL module 310, a PDP management module 320, a PDP control module 330 and a device management module 340; wherein, the RIL module 310 includes: Rild (radio communication module daemon) and Libril (RIL base, radio communication module library).

For the technical solution of the present disclosure:

firstly, function of the RIL module 310 is extended; exactly, interface support of Libril for multi-PDP is added, which enables the Android system to acquire the PDP type of the access device currently supported by the system, the PDP currently in active state and so on;

secondly, a PDP management module 320 is added; this module is one of key modules of the present disclosure, and it takes charge of implementing interface support of Libril for multi-PDP, and manages state of the PDP set up. Specifically, the PDP management module takes charge of acquiring the PDP type supported by the access device, for example, NDIS or PPP, so as to provide reference and basis when an upper level sets up a PDP; it takes charge of managing the PDP state for PDP selection when an upper level applies data processing; selection of the PDP implements joint between an upper level and a lower level and management of PDP resource; setup and destruction of multi-PDP implement specific network connection and disconnection, and other operations;

thirdly, a PDP control module 330 is added; this module includes an NDIS sub-module and an AT (attention) sub-module; wherein, the NDIS sub-module may be obtained by integrating the original QmiDemon module, message processing module and QmiClient module; the AT sub-module may be realized by the original AT module. The PDP control module 330 enables the Android system to process related operations of the NDIS access device and the AT access device concurrently and compatibly; and fourthly, the device management module 340 is obtained by modifying the original device management module; the original module only supports a multi-NDIS device; the modified module implements unified management to device by monitoring the NDIS access device and the AT access device.

The process of driving multi-PDP data communication implemented by each module is elaborated below.

In the RIL module 310, the Libril extends an interface supporting multi-PDP on basis of the original Libril of the Android system; this interface mainly provides PDP management for the upper level of the Android system. Through the interface, it may be implemented that acquiring the PDP type of the access device is based on NDIS or PPP; acquiring the PDP state, taking charge of maintenance of the PDP state and resource management, and providing option for PDP selection; when the PDP is set up or destroyed, the access device corresponding to the PDP which is set up or destroyed and the capability of the access device (e.g., dialling in a mode of NDIS+QMI or PPP protocol) are shown through the PDP type (NDIS or PPP type) and device ID.

The PDP management module 320 is specifically configured to make the extended multi-PDP support interface perform PDP management; based on calling of the extended multi-PDP support interface, acquiring the PDP type of the access device, the setup and destruction of a PDP, acquiring the PDP state, and managing and maintaining the PDP state may be implemented.

Specifically, maintaining the PDP state aims at: firstly, providing resource and basis for PDP selection, in the subsequent process of performing PDP selection, determining which PDPs are idle currently and can be selected, which PDPs are in busy state and can not be selected; secondly, updating PDP resource state, if both state and amount of the PDP need to be updated after the PDP is set up successfully, and then both state and amount of the PDP need to be updated after the PDP is destroyed successfully. Specifically, in the present disclosure, the state of each PDP set up is maintained through the PDP resource state table.

Wherein, the PDP selection is started based on a PDP selection request from the upper level; the PDP management module 320 selects the PDP preferably through the following way: first checking existing PDP resource in idle state, selecting the corresponding PDP in order in case of the PDP types (the PDP types based on type of the access device) are the same; if there is one or multiple PDPs based on a PPP device, selecting them in order; so does an NDIS device; in case of the PDP types are different, preferentially selecting the PDP based on NDIS in order of speed, for example, if there are both the PDP based on NDIS and the PDP based on PPP, preferentially selecting the PDP based on NDIS; if there is no the PDP based on NDIS, selecting the PDP based on PPP.

For the setup and destruction of the PDP, the setup of the PDP takes charge of setup of data link, namely dialling process; if it is the NDIS device, dialling in the mode of NDIS+QMI currently; if it is the PPP device, dialling in the mode of PPP protocol; specifically, the dialling process of PPP is completed through a program of pppd under the Android system.

The PDP control module 330 mainly refines information sent from the PDP management module into specific instructions, corresponds the specific instructions to a specific device, adds the identifier information of the access device into the instruction and passes the instruction to the device management module 340, so that the device management module 340 may locate, according to the identifier information of the specific access device, to a specific device node to operate.

The device management module 340 monitors the access device based on PPP and the access device based on NDIS through the daemon to implement unified management to the access device, which makes the capability of device (which means the device supports which type of access way), state information of device and type information based on specific device under management of this module, thereby providing operation support for operation of the PDP control module 330.

To sum up, for extending single PDP to become multi-PDP in the existing Android system, the present disclosure enables the PDP to be a data link set up based on NDIS or PPP, wherein each PDP may be either a data access way of the NDIS+QMI protocol or a data access way of the original Modem+PPP protocol, enables the Android system to perform PDP selection according to the specific data service type of users while supporting multi-PDP, so as to select the most proper PDP to process different application data requests; for implementation mode, whether the PDP is based on NDIS or PPP, its interface to the upper level is integrated into existing RIL framework of the Android system, instead of modifying the architecture of RIL and Framework of the Android system, thereby enhancing the extensibility of the Android system.

Embodiment 3

Figure 4:
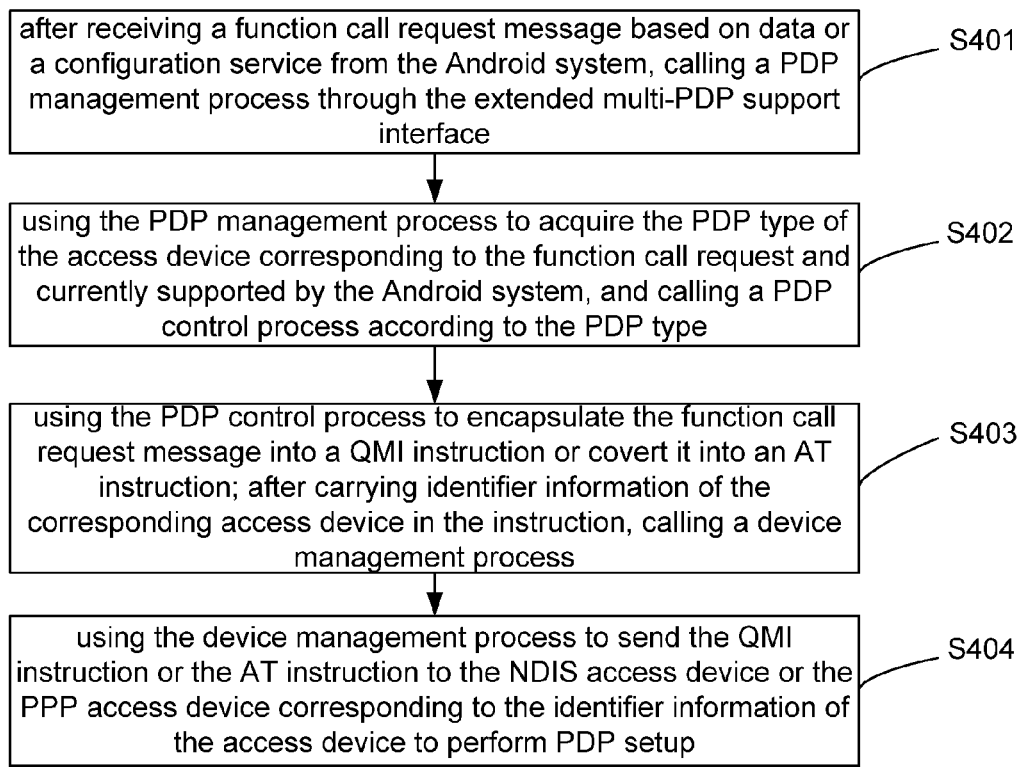
FIG. 4 is a flowchart of a method of driving multi-PDP data communication for a mobile broadband device provided by a third embodiment of the present disclosure.

As shown in FIG. 4, the embodiment of the present disclosure provides a method of driving multi-PDP data communication for a mobile broadband device, including:

S401: after receiving a function call request message based on data or a configuration service from the Android system, calling a PDP management process through the extended multi-PDP support interface;

S402: using the PDP management process to acquire the PDP type of the access device corresponding to the function call request and currently supported by the Android system, and calling a PDP control process according to the PDP type;

S403: using the PDP control process to encapsulate the function call request message into a QMI instruction or covert it into an AT instruction; after carrying identifier information of the corresponding access device in the instruction, calling a device management process; and S404: using the device management process to send the QMI instruction or the AT instruction to the NDIS access device or the PPP access device corresponding to the identifier information of the access device to perform PDP setup;

in this step, the device management process acquires the NDIS access device or the PPP access device corresponding to the QMI instruction or the AT instruction by inquiring the maintained device state information table; wherein, the device state information table records state information, supported PDP type information and identifier information of each access device which is currently supported by the system.

Wherein, after the PDP is set up or destroyed successfully, the PDP management process updates the maintained PDP resource state table in which a PDP type, a PDP state and identifier information of the corresponding access device are recorded.

Furthermore, processing of multi-PDP application data request may be implemented based on the driving method of the embodiment; the specific implementation mode is as follows:

Step a: when an application data request message from the Android system is received, calling the PDP management process through the extended multi-PDP support interface; and Step b: using the PDP management process to acquire a PDP in idle state according to the PDP resource state table, and allocating a certain PDP in idle state for this application data request according to a preset selection rule to perform PDP register.

Preferably, the preset selection rule includes: determining whether there are different PDP types of the PDP in idle state, if so, preferentially selecting the PDP type with high processing speed to allocate PDP; or else, allocating PDP in order or randomly.

For describing the specific implementation process of the method of the present disclosure more clearly, the method of the present disclosure is illustrated below through a use case of downlink control data flow and a use case of downlink application data flow respectively.

Example 1

Figure 5:
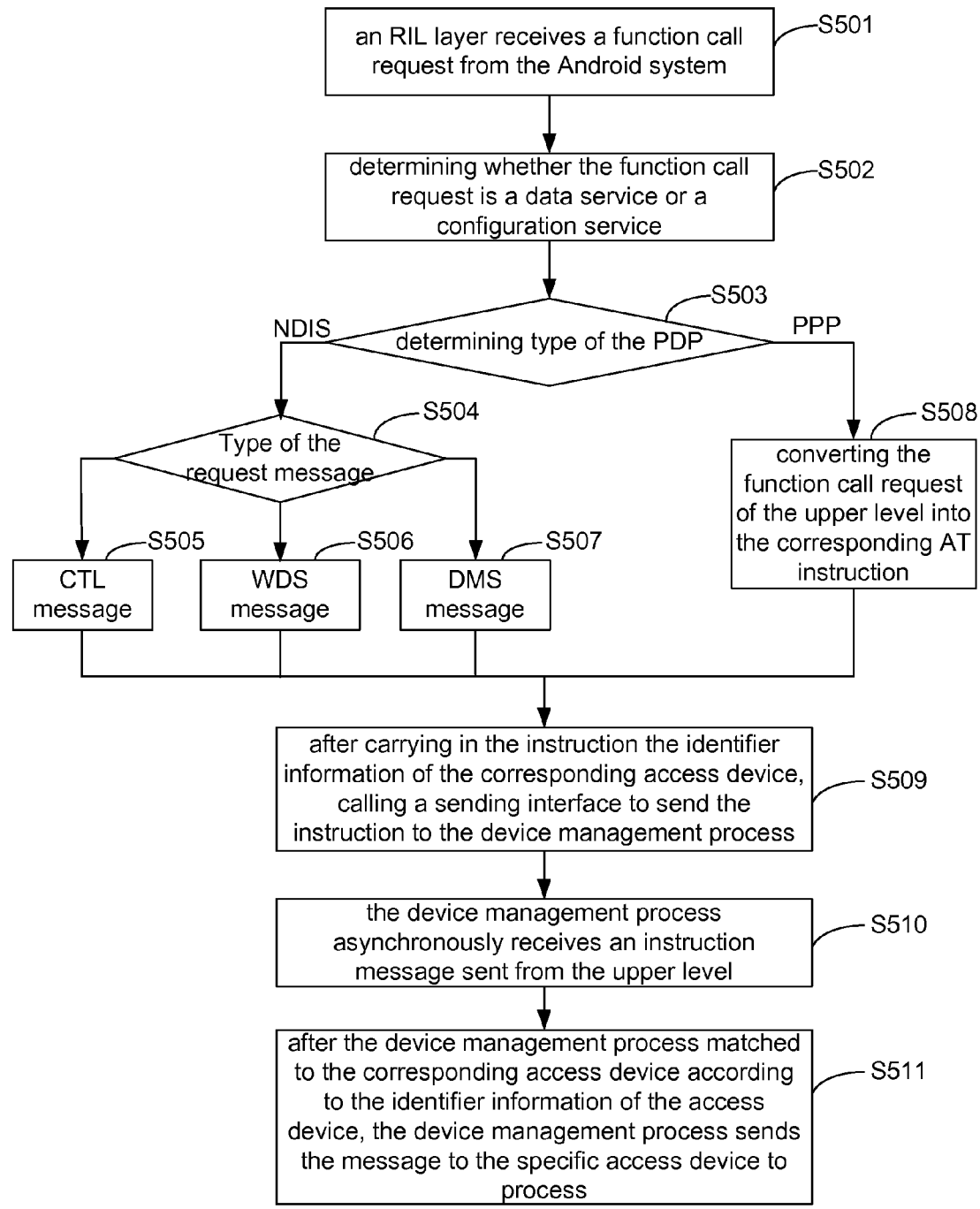
FIG. 5 is a flowchart of a use case of downlink control data flow in service implementation provided by a first example of the present disclosure.

The present example provides a use case of downlink control data flow in service implementation; as shown in FIG. 5, the use case includes the following steps:

S501: an RIL layer received a function call request from the Android system;

S502: determining whether the function call request is a data service or a configuration service; if so, turning to S503; or else, if the function call request is text message, phonebook or other services, then it is not in the scope of this patent;

S503: acquiring the PDP type of the access device corresponding to the function call request and currently supported by the system; if it is the PDP based on NDIS, executing S504; if it is the PDP based on PPP, executing S508;

S504: determining type of the function call request message; if it is the CTL message type, executing S505; if it is the WDS message type, executing S506; if it is the DMS message type, executing S507;

S505: after encapsulating the corresponding QMI instruction according to related protocol of CTL in the QMI instruction, turning to S509;

S506: after encapsulating the corresponding QMI instruction according to related protocol of WDS in the QMI instruction, turning to S509;

S507: after encapsulating the corresponding QMI instruction according to related protocol of DMS in the QMI instruction, turning to S509;

S508: after converting the function call request of the upper level into the corresponding AT instruction, turning to S509;

S509: after carrying in the instruction the identifier information of the corresponding access device, calling a sending interface to send the instruction to the device management process;

S510: the device management process asynchronously receives an instruction message sent from the upper level; wherein, when there are multiple instruction messages received, the received messages may be buffered in queue; and S511: after the device management process matched to the corresponding access device according to the identifier information of the access device, the device management process sends the message to the specific access device to process.

Example 2

Figure 6:
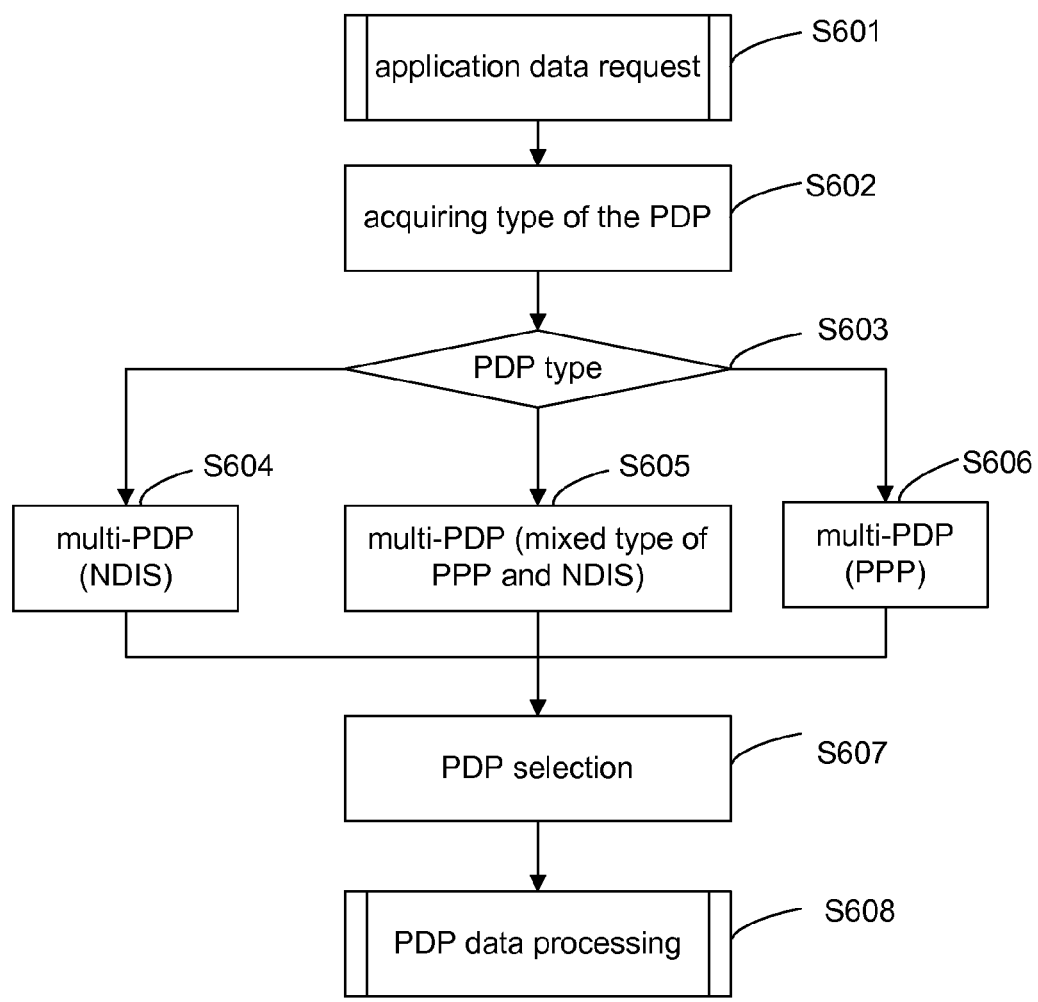
FIG. 6 is a processing flowchart of downlink application data flow in service implementation provided by a second example of the present disclosure.

The present example provides a processing flow of downlink application data flow in service implementation; as shown in FIG. 6, the processing flow includes the following steps:

S601: an RIL layer receives an application data request from a user;

S602: acquiring type of the PDP in idle state of the current system according to the maintained PDP resource state table;

S603: according to the currently acquired PDP types, if all of them are the PDP based on NDIS, turning to S604; if they are mixed-type PDP, turning to S605; if all of them are the PDP based on PPP, turning to S606;

S604: if all the PDPs in active state are based on NDIS, selecting the PDP in idle state in order; and then turning to S607;

S605: if all the PDPs in active state are mixed-type, that is, there are PDPs based on both NDIS and PPP, preferentially selecting the PDP based on NDIS, and then selecting the PDP based on PPP; and then, if there are multiple PDPs based on NDIS or PPP, selecting the PDP in idle state in order, and then turning to S607;

S606: if all the PDPs in active state are based on PPP, selecting the PDP in idle state in order;

S607: after selecting the specific PDP, registering the corresponding PDP, so that application of the upper level joints with the specific PDP; and S608: after registering the PDP is completed, receiving and transmission of data may be performed through the specific PDP.

To sum up, the device and method of the present disclosure add support of the Android system for multi-PDP communication, and solve the problem that because the existing Android system only supports single PDP, it is impossible to use multiple data services simultaneously, for example, multimedia message and common data service can not be used simultaneously; wherein, the PDP type may be data link which is set up based on NDIS or PPP, so that the Android system is equipped with stronger data communication capability; after adopting this multi-PDP technical solution, it may be supported that multiple data services of users are used simultaneously, except that, when there are multiple PDPs in active state, the preferential selection of PDP will be possible;

In addition, with requirement of users for higher data communication speed of mobile broadband and richer service type, the multi-PDP technology will become one of the requisite technical solutions of the Android system in future, and the multi-PDP technology based on NDIS or PPP greatly meets the access way of further multi-mode device and the development trend of technology, and extends function of the Android system;

Moreover, the present disclosure integrates the access way based on NDIS device and PPP device into the existing RIL framework of the Android system without modifying the architecture of RIL and Framework of the Android system, adds the access way of the Android system to a mobile broadband device, and enhances the extensibility of the Android system; at the same time, a PDP control module is added, the control difference of NDIS device and PPP device is encapsulated, and the extensibility of software implementation is enhanced.

Obviously, those skilled in the field can make various modifications and variations to the present disclosure without departing from the spirit and scope of the present disclosure. Thus, if these modifications and variations of the present disclosure fall within the scope of the claims of the present disclosure and equivalent technologies thereof, the present disclosure is also intended to include these modifications and variations.

The invention claimed is:

1. A device of driving multi-Packet Data Protocol (PDP) data communication for a mobile broadband device, comprising: a Radio Interface Layer (RIL) module, a PDP management module, a PDP control module and a device management module; wherein,
the RIL module is configured to receive a function call request message based on data or a configuration service from an Android system, call the PDP management module through an extended multi-PDP support interface, and send the function call request message to the PDP management module;
the PDP management module is configured to acquire a PDP type of an access device corresponding to the function call request sent from the RIL module and currently supported by the Android system, trigger the corresponding PDP control module according to the PDP type, and send the function call request message to the PDP control module; the management module is further configured to, after the PDP is set up or destroyed successfully, update a maintained PDP resource state table in which a PDP type, a PDP state and identifier information of the corresponding access device are recorded; wherein the PDP type of the access device includes: an NDIS-based PDP and a PPP-based PDP;
the PDP control module is configured to encapsulate, based on a Network Driver Interface Spec (NDIS) or a Point to Point Protocol (PPP), the function call request message sent from the PDP management module into a Qualcomm MSM Interface (QMI) instruction or covert it into an AT instruction, carry the identifier information of the access device in the QMI instruction or the AT instruction and output the instruction to the device management module; and
the device management module is configured to send, according to the identifier information of the access device, the QMI instruction or the AT instruction sent from the PDP control module to the corresponding access device to perform PDP setup.

2. The device according to claim 1, wherein,
the RIL module is further configured to, after receiving an application data request message from the Android system, call the PDP management module through the extended multi-PDP support interface, and send the function call request message to the PDP management module; and
the PDP management module is further configured to, after receiving the function call request message from the RIL module, acquire the PDP in idle state according to the PDP resource state table, allocate the PDP in idle state for this application data request according to a preset selection rule to perform PDP register.

3. The device according to claim 2, wherein,
the PDP management module is configured to save the preset selection rule;
wherein the selection rule comprises: determining whether there are different PDP types of the PDP in idle state, if so, preferentially selecting the PDP type with high processing speed to allocate PDP; or else, allocating PDP in order or randomly.

4. The device according to claim 1, wherein,
the device management module is configured to acquire the access device corresponding to the QMI instruction or the AT instruction by inquiring a maintained device state information table;
wherein the device state information table comprises: state information, supported PDP type information and identifier information of each access device which is currently supported by the system.

5. The device according to claim 4, wherein,
the PDP management module is configured to acquire the PDP type of the access device currently supported by the system by calling the device management module.

6. The device according to claim 1, wherein the PDP control module comprises: an NDIS sub-module and an AT sub-module; wherein,
the NDIS sub-module is configured to encapsulate, through a QMI daemon, the function call request message based on NDIS into a corresponding QMI instruction, carry in the QMI instruction the identifier information of the corresponding access device, and output the instruction to the device management module through an NDIS drive process; and
the AT sub-module is configured to convert a PPP-based PDP setup request into a corresponding AT instruction, carry in the instruction the identifier information of the corresponding access device, and output the instruction to the device management module through a PPP drive process.

7. The device according to claim 2, wherein the PDP control module comprises: an NDIS sub-module and an AT sub-module; wherein,
the NDIS sub-module is configured to encapsulate, through a QMI daemon, the function call request message based on NDIS into a corresponding QMI instruction, carry in the QMI instruction the identifier information of the corresponding access device, and output the instruction to the device management module through an NDIS drive process; and
the AT sub-module is configured to convert a PPP-based PDP setup request into a corresponding AT instruction, carry in the instruction the identifier information of the corresponding access device, and output the instruction to the device management module through a PPP drive process.

8. The device according to claim 3, wherein the PDP control module comprises: an NDIS sub-module and an AT sub-module; wherein,
the NDIS sub-module is configured to encapsulate, through a QMI daemon, the function call request message based on NDIS into a corresponding QMI instruction, carry in the QMI instruction the identifier information of the corresponding access device, and output the instruction to the device management module through an NDIS drive process; and
the AT sub-module is configured to convert a PPP-based PDP setup request into a corresponding AT instruction, carry in the instruction the identifier information of the corresponding access device, and output the instruction to the device management module through a PPP drive process.

9. The device according to claim 7, wherein,
the PDP management module is configured to acquire the PDP type of the access device currently supported by the system by calling the device management module.

10. The device according to claim 8, wherein,
the PDP management module is configured to acquire the PDP type of the access device currently supported by the system by calling the device management module.

11. The device according to claim 2, wherein the PDP control module comprises: an NDIS sub-module and an AT sub-module; wherein,
the NDIS sub-module is configured to encapsulate, through a QMI daemon, the function call request message based on NDIS into a corresponding QMI instruction, carry in the QMI instruction the identifier information of the corresponding access device, and output the instruction to the device management module through an NDIS drive process; and
the AT sub-module is configured to convert a PPP-based PDP setup request into a corresponding AT instruction, carry in the instruction the identifier information of the corresponding access device, and output the instruction to the device management module through a PPP drive process.

12. The device according to claim 3, wherein the PDP control module comprises: an NDIS sub-module and an AT sub-module; wherein,
the NDIS sub-module is configured to encapsulate, through a QMI daemon, the function call request message based on NDIS into a corresponding QMI instruction, carry in the QMI instruction the identifier information of the corresponding access device, and output the instruction to the device management module through an NDIS drive process; and
the AT sub-module is configured to convert a PPP-based PDP setup request into a corresponding AT instruction, carry in the instruction the identifier information of the corresponding access device, and output the instruction to the device management module through a PPP drive process.

13. A method of driving multi-Packet Data Protocol (PDP) data communication for a mobile broadband device, comprising:
after receiving a function call request message based on data or a configuration service from an Android system, calling a PDP management process through an extended multi-PDP support interface;
using the PDP management process to acquire a PDP type of an access device corresponding to the function call request and currently supported by the Android system, and calling a PDP control process according to the PDP type; wherein the PDP type of the access device includes: an NDIS-based PDP and a PPP-based PDP;
using the PDP control process to encapsulate the function call request message into a Qualcomm MSM Interface (QMI) instruction or covert it into an AT instruction; after carrying identifier information of the access device in the QMI instruction or the AT instruction, calling a device management process;
using the device management process to send the QMI instruction or the AT instruction to an access device corresponding to the identifier information of the access device to perform PDP setup;
wherein after the PDP is set up or destroyed successfully, updating, by the PDP management process, a maintained PDP resource state table in which a PDP type, a PDP state and identifier information of the corresponding access device are recorded.

14. The method according to claim 13, further comprising:
when an application data request message from the Android system is received, calling the PDP management process through the extended multi-PDP support interface; and
using the PDP management process to acquire a PDP in idle state according to the PDP resource state table, and allocating the PDP in idle state for this application data request according to a preset selection rule to perform PDP register.

15. The method according to claim 14, wherein the preset selection rule comprises: determining whether there are different PDP types of the PDP in idle state, if so, preferentially selecting the PDP type with high processing speed to allocate PDP; or else, allocating PDP in order or randomly.

16. The method according to claim 13, wherein before using the device management process to send the QMI instruction or the AT instruction to an access device corresponding to the identifier information of the access device, the method further comprises: acquiring, by the device management process, the access device corresponding to the QMI instruction or the AT instruction by inquiring a maintained device state information table; wherein the device state information table comprises: state information, supported PDP type information and identifier information of each access device which is currently supported by the system.

17. The method according to claim 14, wherein before using the device management process to send the QMI instruction or the AT instruction to an access device corresponding to the identifier information of the access device, the method further comprises: acquiring, by the device management process, the access device corresponding to the QMI instruction or the AT instruction by inquiring a maintained device state information table; wherein the device state information table comprises: state information, supported PDP type information and identifier information of each access device which is currently supported by the system.

18. The method according to claim 15, wherein before using the device management process to send the QMI instruction or the AT instruction to an access device corresponding to the identifier information of the access device, the method further comprises: acquiring, by the device management process, the access device corresponding to the QMI instruction or the AT instruction by inquiring a maintained device state information table; wherein the device state information table comprises: state information, supported PDP type information and identifier information of each access device which is currently supported by the system.

* * * * *